United States Patent Office 3,528,740
Patented Sept. 15, 1970

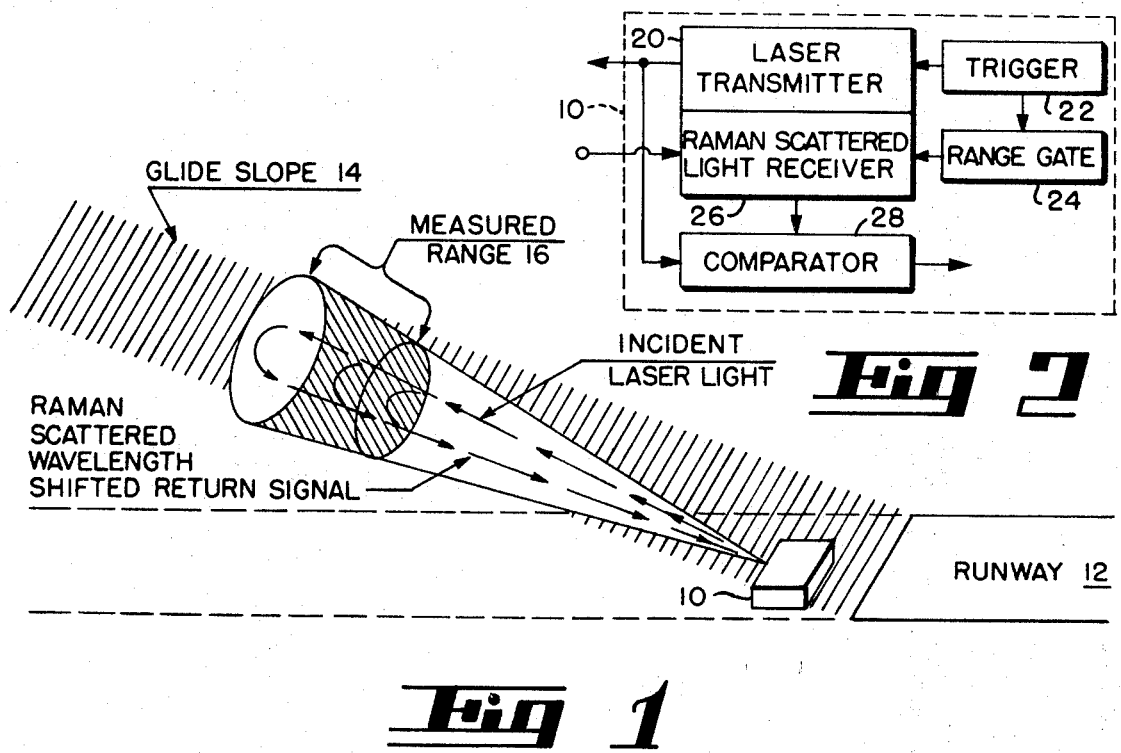
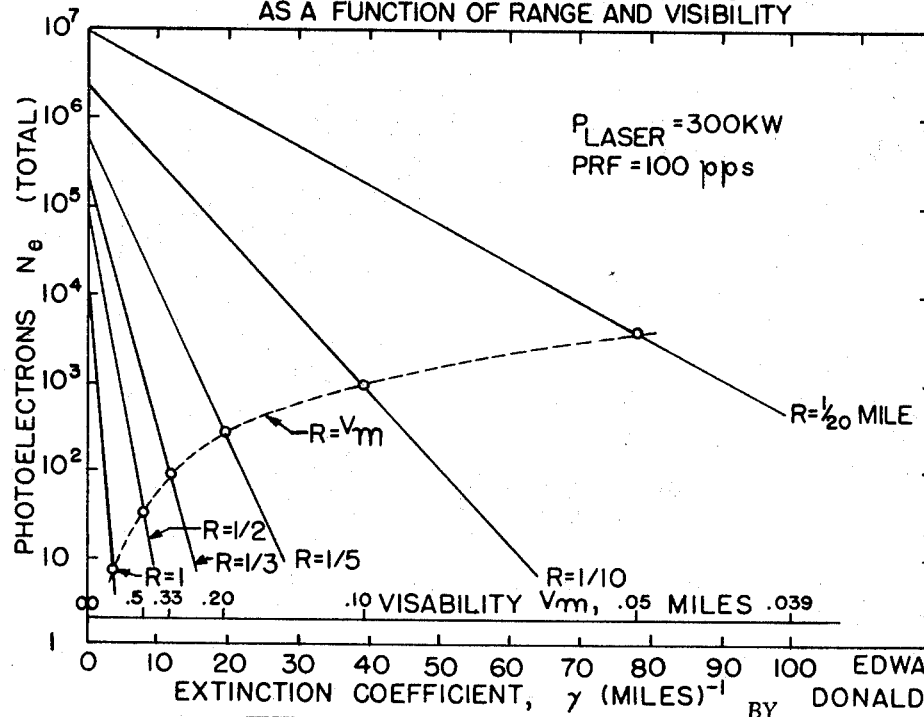

3,528,740
SINGLE-ENDED TRANSMISSOMETER UTILIZING A PULSED LASER FOR DETERMINING VISUAL RANGE
Edward T. Gerry, Boston, and Donald A. Leonard, Stoneham, Mass., assignors to Avco Corporation, Everett, Mass., a corporation of Delaware
Filed June 21, 1967, Ser. No. 647,697
Int. Cl. G01c 3/08
U.S. Cl. 356—5                    6 Claims

ABSTRACT OF THE DISCLOSURE

The apparatus disclosed includes a transmitter for transmitting a pulsed laser beam along a path, the visual range of which is to be determined. A receiver, located at the site of the transmitter, is tuned to the Raman scattered radiation. The Raman scattering is at a different frequency from the transmitted energy and, being essentially proportional only to the nitrogen or oxygen content in the air, is a determinable, constant factor for a given range. Therefore the received Raman signal is equal to a known constant Raman scattering less any absorbed energy. Since the energy absorption is due to elements in the atmosphere, such as moisture, dust, and smoke, the greater the absorption, the lower the visibility. The described equipment utilizes a range gate on the receiver for receiving Raman scattering only over a preselected range along the path being measuerd. Thus, by measuring the ratio of the transmitted energy to the received energy, a direct measurement of atmospheric absorption over the specified range results.

Introduction

There has been a long-felt ned for a system for measuring the visual range along the approach path of an aircraft to a runway. The lack of such a system has reseulted in many missed approaches which are expensive and potentially dangerous.

Present systems provide slant range visibility by inferences derived from measurements of runway visual range and ceiling visibility; however, slant range visibility can be inferred only if it is assumed that there is a particular functional dependence of atmospheric absorption coefficient on altitude and, in addition, that the conditions on and above the runway are the same as those along the glide slope. Both of these assumptions may be in error under certain atmospheric conditions, and furthermore, it would be simpler, more convenient, and more accurate if the measurement of atmospheric absorption coefficient could be made along the actual glide slope.

Visual range along the runway can easily be determined with a double-ended transmissometer having a light source located at a known distance from a photosensitive detector. The absorption of the atmosphere can easily be determined by comparing the light received with the known quantity which would be received on a clear day. Unfortunately, a simple double-ended transmissometer does not serve to provide the visual range along the glide slope since the light source and detector cannot be conveniently separated. This invention provides a single-ended transmissometer system, that is, the receiver and transmitter are both positioned at the same location beside the runway.

THE PRIOR ART

In April 1965 Twomey and Howell disclosed a single-ended transmissometer in Applied Optics, Issue 4, page 502. The Twomey and Howell method involved the transmission of light and the determination of the relationship between the received backscatter and the transmission. As taught by Van de Hulst in Light Scattering by Small Particles, published by oJhn Wiley & Sons, Inc., New York, in 1957, this relationship is calculable provided the composition and size distribution function of the scattering particles is known. Twomey and Howell showed that although the relation between backscatter and absorption varied widely with size distribution for monochromatic light, this variation could be considerably reduced by the use of "white light." Even so, the resultant relationship is still dependent on the particle size distribution function yielding an uncertainty in absorption coefficient or visual range of about a factor or two.

SUMMARY OF THE INVENTION

The now disclosed single-ended transmissometer eliminates the disadvantages of the backscatter system of Twomey and Howell and, in effect, yields the same result as the double-ended transmissometer. Briefly stated, the invention takes advantage of the known Raman effect by transmitting energy from a light source of known intensity over a known distance and determining the absorption of the Raman scattering. The Raman effect is expressed as being a change in frequency of the incident radiation due to a change in rotational or vibrational energy of the scattering molecules. The receiver and transmitter are side by side along the runway. The direct transmission through the atmosphere to a particular portion of the glide slope and back to the receiver is measured. The light source is a laser emitting a short pulse along the glide slope, that is, in the direction the visibility is to be measured. The receiver is a range gated photodetector which is tuned to the light wavelength corresponding to the vibrational Raman scattering of the incident laser beam from a component of the atmosphere; that is, from the nitrogen or oxygen. The time delay before the receiver is gated on specifies the range at which the measured scattering occurs. The length of time the receiver remains on specifies the path length along which visibility is being measured. In effect, the system is an optical radar in which the receiver is gated on to receive signals from only the specified range interval. It differs from radar in that the receiver is tuned to a wavelength differnt from that which is transmitted.

Whereas the energy of backscattered incident light is dependent on the nature of the particles in the atmosphere (and it is the nature of the atmosphere which we are attempting to measure), the intensity of the Raman scattering is dependent only upon the nitrogen or oxygen content of the air. The oxygen and nitrogen contents are essentially constant for all atmospheric conditions. Therefore, the backscattered Raman energy received will be dependent only upon range, the intensity of the transmitted beam (both of which are known), and the absorption due to particles in the air. Therefor, it is possible to determine visibility along a particular portion of the glide slope by simply determining the ratio of the transmitted energy to the received Raman scattering.

THE DRAWINGS

FIG. 1 shows a representative embodiment of this invention;

FIG. 2 is a diagrammatic representation of the optical transmitting and receiving equipment; and FIG. 3 is a series of curves showing the expected performance of this invention.

THE ILLUSTRATED EMBODIMENT

As seen in FIG. 1, the invention includes a single-ended optical transmitting and receiving transmissometer 10 which is positioned alongside a runway 12 and which is directed along a guide slope 14, or any other selected path, the visibility of which is to be determined.

The transmissometer 10 transmits incident light of a predetermined wavelength and of known intensity, and receives reflected ligt energy during a range gated interval reprsenting reflections from a particular portion of the guide slops 14. This portion is indicated in the drawing as the measured range 16. The receiver portion of the transmissometer 10 is tuned to the wavelength of the Raman scattering.

The transmissometer 10 is shown in more detail in the block diagram of FIG. 2. It includes a laser transmitter 20 for producing pulses of light which are directed with a conical spread along the guide slope. The transmitted pulses are triggered by a conventional trigger device 22 which also serves to operate a range gate circuit 24. The trigger output to the laser transmitter 20 originates the transmission of a laser pulse. The trigger output to the range gate 24 originates a delayed range gate pulse which is applied to a light receiver 26. The range gate pulse permits reception of reflected light only from the measured range. That is, the receiver is enabled by the range gate 24 for reception of energy only during the period equal to $2(t_2-t_1)$, where $t_1$ is the time of travel to the beginning of the measured range 16 along the guide slope, and $t_2$ is the time of travel to the end of the measured range 16. During the period $2(t_2-t_1)$, the receiver 26 receives the Raman scattering to which it is tuned.

A portion of the transmitted energy from the laser transmitter 20 and a portion of the Raman scattering energy received by the light receiver 26 are applied to a comparator 28, preferably a device for deriving an output proportional to the ratio between the transmitted incident light and the received Raman scattering. The output from the comparator 28 is a function of the visibility over the measured range.

THEORETICAL CALCULATION

The basic concept of utilizing Raman scattering from a known constituent of air, such as nitrogen, could be employed with any laser. However, for the purpose of the following theoretical calculations, a pulsed nitrogen laser as the light source will be assumed. The following characteristics will also be assumed: wavelength=3371 A.; power output=300 kilowatts; pulse duration=20 nanoseconds; repetition rate=100 pulses per second.

The pulsed laser is required for range resolution and the 20 nanoseconds self-terminating pulses of the pulsed nitrogen laser give a natural range resolution of about 20 feet. For a high information rate and for obtaining a good time average over a time comparable to some characteristic viewing time during a landing approach, a high pulse repetition rate is desirable. The pulsed nitrogen laser can be operated in a superradiant mode which produces a 1 milliradian beam divergence with a single prealigned mirror.

The number of photoelectrons collected by a detection system in a single-ended laser transmissometer using Raman scattering from atmospheric nitrogen is given by the following expression:

$$N_e = N_L N_{N_2} \sigma_{\text{RAMAN SCAT}} \Omega \epsilon_p \epsilon_0 e^{-2\gamma R}$$

Where $N_e$=number of photoelectrons collected per pulse.
$N_L$=number of laser photons in outgoing pulse.
$N_{N_2}$=density of nitrogen molecules in atmosphere, particles/cm.$^3$.
$\sigma_{\text{RAMAN}}$=Raman scattering cross section for nitrogen molecules, cm.$^2$/steradian.
$L_{\text{SCAT}}$=length of scattering region which is observed.
$\Omega$=solid angle of collection optics, steradians.
$\epsilon_p$=photoelectric efficiency of photomultiplier.
$\epsilon_0$=optical efficiency of collection optics and optical filters.
$\gamma$=extinction coefficient, miles $^{-1}$.
R=range from transmissometer to scattering region.

The incoming signal from the Raman scattering will be averaged over many pulses and displayed. The total number of photoelectrons collected in an integration time, $N_e^{(\text{TOTAL})}$, is equal to $N_e f T$, where $f$ is the pulse repetition rate and T is the integration time.

The results of such a Raman scattering calculation are displayed in FIG. 3, which is a plot of $N_e^{(\text{TOTAL})}$ as a function of the extinction coefficient, $\gamma$. Shown on this plot are lines for various values of the range R, the distance from the laser to the scattering region. The abscissa is labeled both as an extinction coefficient $\gamma$, and also as a visibility, $V_m$. The visiblity $V_m$ is defined as that distance at which the contract transmittance[6] is 2 percent, i.e., $e^{-\gamma V_m}=0.02$ or $V_m=3.912/\gamma$. This figure shows how many photoelectrons would be collected for a given range and visibility. It can be seen that the number of photoelectrons collected from a given range determines the visibility to that range. The numerical factors used in generating FIG. 3 are the following: Peak laser power=300 kilowatts; laser pulse duration=20 nanoseconds; laser wavelength=3371 A.; density of nitrogen molecules=$2.1\times10^{19}$ cm.$^{-3}$; Raman scattering cross-section for nitrogen molecules=$1.8\times10^{-29}$ cm.$^2$ per steradian; scattering length or range cell=100 feet; diameter of collection telescope=3 feet; repetition rate=100 pulses per second, integration time=10 seconds; $\epsilon_p=\epsilon_0=10\%$.

The curved dashed line labeled $R=V_m$ indicates the locus of points where the range R of the range gate is equal to the visibility $V_m$. This might be a typical operating regime for the transmissometer system. It should be carefully noted that a single-ended transmissometer system of this type has a very large intrinsic dynamic range. The dynamic range for measuring visibility is adjusted by changing the range gate. For the example given in FIG .3, the signal changes by a factor of 400 along the dashed line $R=V_m$ for a change in $V_m$ from 1 mile to .05 mile.

In summary, the invention contemplates the use of a laser transmitter for transmitting incident light energy of a known wavelength along a path and a receiver positioned alongside the transmitter for receiving Raman scattered reflected energy of the transmitted incident light. In the embodiment shown, the transmitted laser beam is pulse-modulated by a trigger which also controls the operation of the range gate. Other types of modulation are also possible, provided a signal representing the Raman scattering over a particular range can be derived. The signal representing the Raman scattering yields the desired visibility information when compared with a reference.

It is apparent that various modifications will be available to persons skilled in the art, and it is intended that the invention be limited only by the following claims as read in the light of the prior art.

We claim:

1. In a system for measuring visibility along a given path, the combination comprising:
   (1) a light transmitter for transmitting incident light energy of a known wavelength along said path;
   (2) a receiver positioned at essentially the same location as said transmitter for receiving reflected light energy, said receiver being tuned to receive the Raman scattered reflected energy of said incident light energy; and
   (3) means for comparing the intensity of said received Raman scattering with a reference, said comparison being a function of the visibility along said path.

2. The invention as defined in claim 1 wherein said incident light energy is a laser beam.

3. The invention as defined in claim 2 wherein said transmitted incident light energy is pulse modulated.

4. The invention as defined in claim 3, wherein said receiver includes a range gate for permitting reception of said Raman scatter reflected energy only from a given portion of said path.

5. The invention as defined in claim 4 wherein said reference comprises a signal having an intensity proportional to the transmitted incident light energy.

6. The invention as defined in claim 1 wherein said incident light energy is a laser beam;
a trigger for repeatedly generating trigger pulses, said beam being pulse modulated by said trigger pulses; and
a range gate for said receiver, said range gate inhibiting reception of energy except from a given portion of said path, said trigger pulse being applied to said range gate for controlling the operation of said range gate.

References Cited

UNITED STATES PATENTS 3,371,574  3/1968  Dwyer _____ 356—75 X
3,442,591  5/1969  Ogura _____ 356—75

RODNEY D. BENNETT, JR., Primary Examiner

J. P. MORRIS, Assistant Examiner

U.S. Cl. X.R.

356—75